US012333009B2

(12) United States Patent
Ivanov (10) Patent No.: US 12,333,009 B2
(45) Date of Patent: Jun. 17, 2025

(54) SYSTEM AND METHOD OF ANOMALY DETECTION IN THE BEHAVIOR OF TRUSTED PROCESS

(71) Applicant: AO Kaspersky Lab, Moscow (RU)

(72) Inventor: Andrey A. Ivanov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 303 days.

(21) Appl. No.: 17/960,952

(22) Filed: Oct. 6, 2022

(65) Prior Publication Data

US 2023/0359737 A1     Nov. 9, 2023

(30) Foreign Application Priority Data

May 6, 2022   (RU) ................. 2022112463

(51) Int. Cl.
    *G06F 21/56*     (2013.01)
    *G06F 21/51*     (2013.01)

(52) U.S. Cl.
    CPC ............ *G06F 21/566* (2013.01); *G06F 21/51* (2013.01); *G06F 2221/034* (2013.01)

(58) Field of Classification Search
None
See application file for complete search history.

(56) References Cited

U.S. PATENT DOCUMENTS

| 2017/0093897 | A1* | 3/2017 | Cochin | ................. | H04L 63/145 |
| 2019/0378397 | A1* | 12/2019 | Williams, II | .......... | G06N 20/00 |
| 2023/0034910 | A1* | 2/2023 | Engelberg | ............... | H04L 63/20 |
| 2023/0344843 | A1* | 10/2023 | Zaytsev | ................ | H04L 63/145 |

OTHER PUBLICATIONS

S. Eresheim, L. D. Klausner and P. Kochberger, "Anomaly Detection Support Using Process Classification," 2019 International Conference on Software Security and Assurance (ICSSA), St. Pölten, Austria, 2019, pp. 27-40 (Year: 2019).*
X. Zhang, C. Li and R. Li, "Dynamic Behavior Measurement Based on Interactive Markov Chain," 2009 International Conference on Networks Security, Wireless Communications and Trusted Computing, Wuhan, China, 2009, pp. 468-472 (Year: 2009).*

\* cited by examiner

*Primary Examiner* — Alexander Lagor
*Assistant Examiner* — Felicia Farrow
(74) *Attorney, Agent, or Firm* — ArentFox Schiff LLP; Michael Fainberg (57) ABSTRACT

This application provides a method for detecting anomalies in the behavior of a trusted process. An example method includes detecting a launch of a trusted process in a computer system; selecting a basic behavior model corresponding to the trusted process and a machine learning model corresponding to the trusted process; monitoring execution of the trusted process using the basic behavior model; comparing a total probability of occurrence of all of the plurality of identified events with a predefined threshold; extracting data corresponding to the identified events from a Markov chain, in response to determining that the probability of occurrence of all of the plurality of identified events is below the predefined threshold; analyzing the extracted data using the machine learning model; and generating a decision with respect to presence of anomalous behavior in the trusted process based on the analysis performed by the machine learning model.

20 Claims, 5 Drawing Sheets

SYSTEM AND METHOD OF ANOMALY DETECTION IN THE BEHAVIOR OF TRUSTED PROCESS

CROSS-REFERENCE TO RELATED APPLICATION

This application claims benefit of priority under 35 U.S.C. 119 (a)-(d) to a Russian Application No. 2022112463 filed on May 6, 2022, which is incorporated by reference herein.

FIELD OF TECHNOLOGY

The present disclosure relates generally to computing platforms, and, in particular to methods and systems for detecting anomalies in the behavior of trusted processes.

BACKGROUND

Malicious software, also known as malware, adversely affects the operation of a huge number of computer systems throughout the world. Malicious programs, in all its manifestations, such as computer viruses, worms, rootkits, spyware and unwanted adware, pose a serious danger to millions of computer users, making them vulnerable, among other things, to data loss and secret information, identity theft and loss of productivity. The rivalry between attackers who exploit malware and software vulnerabilities and antivirus software developers has led to the latter playing the role of "catch-up."

Nowadays, cyber attackers tried to become more effective in hiding their activities. Camouflage techniques have made the traditional signature and threshold-based detective measures practically useless. Detective measures are measures that help to identify activities related to the incident. Modern cyber threat defense systems can build a sophisticated 'pattern of life'—that understands what represents normality for every person, device, email activity, and network activity in the system being protected by the cyber threat defense system.

One of the promising areas are end-to-end solutions based on searching for anomalies to detect, isolate, analyze and remove malware faster, more accurately, with less computational overhead, and storage utilization compared to existing techniques. Advantages of these techniques include, but are not limited to: provision of individual layer of protection of the user's device;flexible requirements with respect to frequent updating of databases; ability to detect both known and previously unknown threats.

As a result of exploiting vulnerabilities in the program, attackers may be able to perform malicious actions on behalf of a trusted process. Existing methods for detecting the exploitation of a vulnerability are based on classical methods, such as signature and heuristic analysis, and are not always able to detect the exploitation of a previously unknown vulnerability.

Thus, there is a need for efficient new solutions to solve the problem of finding anomalies and vulnerabilities in programs.

SUMMARY

Disclosed is a new solution for detecting malicious behavior taking advantage of vulnerabilities in trusted processes in a computer system. More specifically, disclosed aspects relate to methods and systems for detecting anomalies in the behavior of trusted processes. Aspects of the present disclosure may involve collaboration of a module implementing machine learning techniques and a module implementing a stochastic modeling tool, such as, but not limited to the Markov chain.

Advantageously, the disclosed aspects increase the efficiency of detecting anomalies in the behavior of trusted processes by applying basic behavior models based on the Markov chain principle in conjunction with one or more machine learning techniques.

In one aspect, a method for detecting an anomaly in the behavior of a trusted process includes detecting a launch of a trusted process in a computer system; selecting a basic behavior model corresponding to the trusted process and a machine learning model corresponding to the trusted process from a data store, wherein the basic behavior model is represented by a Markov chain; monitoring execution of the trusted process using the basic behavior model, wherein monitoring the execution comprises identifying a plurality of events occurring during the execution of the trusted process, determining probability of occurrence of each of the plurality of identified events and calculating a total probability of occurrence of all of the plurality of identified events based on the probability of occurrence of each event; comparing the total probability of occurrence of all of the plurality of identified events with a predefined threshold; extracting data corresponding to the identified events from the Markov chain, in response to determining that the total probability of occurrence of all of the plurality of identified events is below the predefined threshold; analyzing the extracted data using the machine learning model, wherein the extracted data is used as input to the machine learning model; and generating a decision with respect to presence of anomalous behavior in the trusted process based on the analysis performed by the machine learning model.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting anomalies in the behavior of trusted processes based on Markov chains and a machine learning algorithm. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

As noted above, aspects of the present disclosure involve collaboration of a module implementing at least one machine learning technique, and a module implementing a stochastic modeling tool, such as, but not limited to Markov chains. The purpose of the disclosure is to describe a method for detecting anomalies in behavior of trusted processes. In an aspect, basic patterns of behavior for each trusted process may be formed, based on the principle of Markov chains. Furthermore, to each occurring event a weight coefficient may be assigned. The weight coefficient of the event may indicate the probability of this event occurring during the execution of the trusted process. In an aspect, during the execution of a trusted process, the operating system (OS) may observe the occurrence of events. Such occurrence of events may then be compared with events from the pre-generated basic behavior model, and a weight may be assigned to each event, based on the comparison. In an aspect, the total probability of the entire chain of events may be determined based on weighting coefficients. In an aspect, a behavioral log may be formed based on the occurred events. When the total probability of the entire chain reaches a predefined threshold, the generated behavior log may be sent to the module configured to perform analysis of the generated behavior log using a machine learning algorithm. Based on the analysis of the generated behavior log, the presence of an anomaly in the behavior of the trusted process may be assessed. Thus, the aforementioned machine learning module may output a decision with respect to the anomalous behavior of the trusted process based on a number of events that have occurred and/or the absence of particular events in the analyzed series of events. In addition, based on the detected anomaly, an exploited vulnerability in the corresponding trusted process may be further identified.

Glossary: a number of terms are defined herein which will be used to describe variant aspects of the present disclosure.

A "behavior log", as used herein, refers to an ordered set of records of events that have arisen as a result of the operation of a particular trusted process. The use of Markov chain in the generation of a basic behavior log (basic behavior model) may be implemented as a tree representation of events occurring during execution of a trusted process. In an aspect, for each event, the probability of the occurrence of the respective event (weighting) may be determined.

A "trusted process", as used herein, refers to a process that was launched from a trusted executable file, and wherein the executable file has a digital signature of a secure file.

Figure 1:
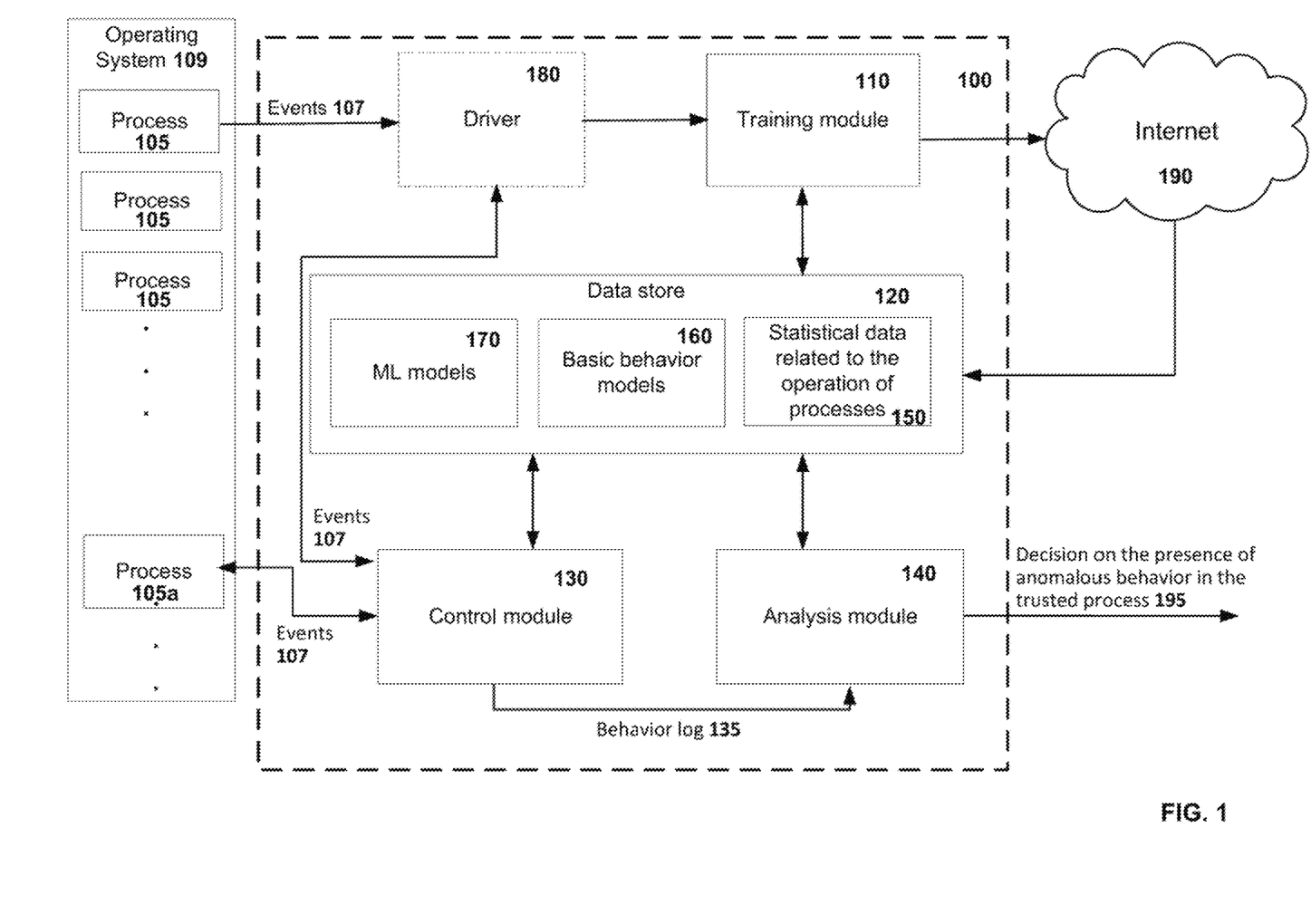
FIG. 1 shows schematically a particular example of a system configured to implement a method for detecting anomalies in the behavior of trusted processes based on Markov chains and a machine learning algorithm.

FIG. 1 shows schematically a particular example of a system 100 configured to implement a method for detecting anomalies in the behavior of trusted processes based on Markov chains and a machine learning algorithm.

In an aspect, the system 100 may include: a training module 110, a data store 120, a control module 130, and an analysis module 140. Furthermore, the data store 120 may be configured to store statistical data related to the operation of processes 150, basic behavior models 160, and Machine learning (ML) models 170.

Various aspects of the present disclosure contemplate collection of information related to the operation of the software on a computer system. If the disclosed system is used on several computer systems interconnected in a network, such as a corporate network, the aforementioned collection of data may be performed on all computer systems (CS) of the network. Based on the collected information, a list of processes whose execution at the monitored computer system will be considered trusted may be identified. Further, in aspect, the training module 110 may be used to generate the basic behavior model 160 and the ML model 170 for each trusted process. Each basic behavior model 160 may model the behavior as a hierarchical fully observed continuous-time Markov chain, where each state (event in the chain of events) is assigned a weighting coefficient. In an aspect, the basic behavior model 160 may be generated based on the collected information related to the operation of the software, which may be presented in the form of a behavior log 135.

It should be noted that the collection of the information in the form of a behavior log 135 and the subsequent generation of the basic behavior models 160 may be performed in advance, prior to executing the disclosed system. According to some aspects, the basic behavior models 160 may be provided with the claimed system and/or may be transmitted/updated via the Internet 190. This option, in particular, is preferred for standard software. In an aspect, preliminary generation of the basic behavior models 160 may be implemented on a remote server (not presented in FIG. 1).

In another aspect, the basic behavior models 160 may be generated immediately at the beginning of execution of the monitored software, in the mode of preparation for execution. In this preparation for execution mode, in real time, information related to the operation of at least one process may be collected during execution of the corresponding process. Furthermore, at this stage, the behavior model 160 and the ML model 170 may be generated for each monitored process. This approach may be preferable for specialized software or when the disclosed system is used on an isolated corporate network.

Depending on the implementation, the basic behavior model 160 may be generated based on both behavior logs 135 containing only trusted events 107 and based on behavior logs 135 containing additional anomalous events 107. As a result of the generation of the basic behavior model 160 low values of weighting coefficients may be assigned to anomalous events. Thus, the generated basic behavior model 160 may contain all theoretically possible events that can occur in a trusted process, with different weights assigned for a particular process.

More specifically, after the behavior log 135 is generated for the trusted process, a weighting coefficient may be determined for each event 107 contained in the specified behavior log 135. In an aspect, the weighting coefficient for each event may be determined by collecting additional similar information about the events of similar software (process) at another monitored computer system. Thus, the collection of information may be performed either from the monitored system within one corporate network, or from all the computer systems monitored via the Internet 190, or from a cloud server containing statistical data related to the operation of trusted processes 150, which may also be performed via the Internet 190.

In an aspect, the weighting coefficient for the event may be assigned based on the probability of the occurrence of the corresponding event 107 in all behavior logs 135 generated from the collected statistical data 150. In other words, to each event, the chain contains the probability of the occurrence of the corresponding event. In an aspect, such probability may be calculated as the ratio of the number of occurrences of a particular event for the current process to the total number of occurrences of the same events for the current process.

Typically, trusted processes, such a process 105a, may contain trusted events 107. A trusted event is usually an event 107 that is not part of a malicious activity (targeted attack) and is typical of the behavior of the monitored software. In an aspect, trusted events have a high probability of occurring during the execution of the trusted process 105a and may be assigned a high value of the weighting coefficient. If for some reason particular trusted events are rare, they typically will not have a high weighting coefficient. In an aspect, such rare trusted events may have rarity parameter associated therewith. In an aspect, this rarity parameter may be taken into consideration when analyzing the behavior log 135 using the ML model 170 before generating the final decision.

Figure 2:
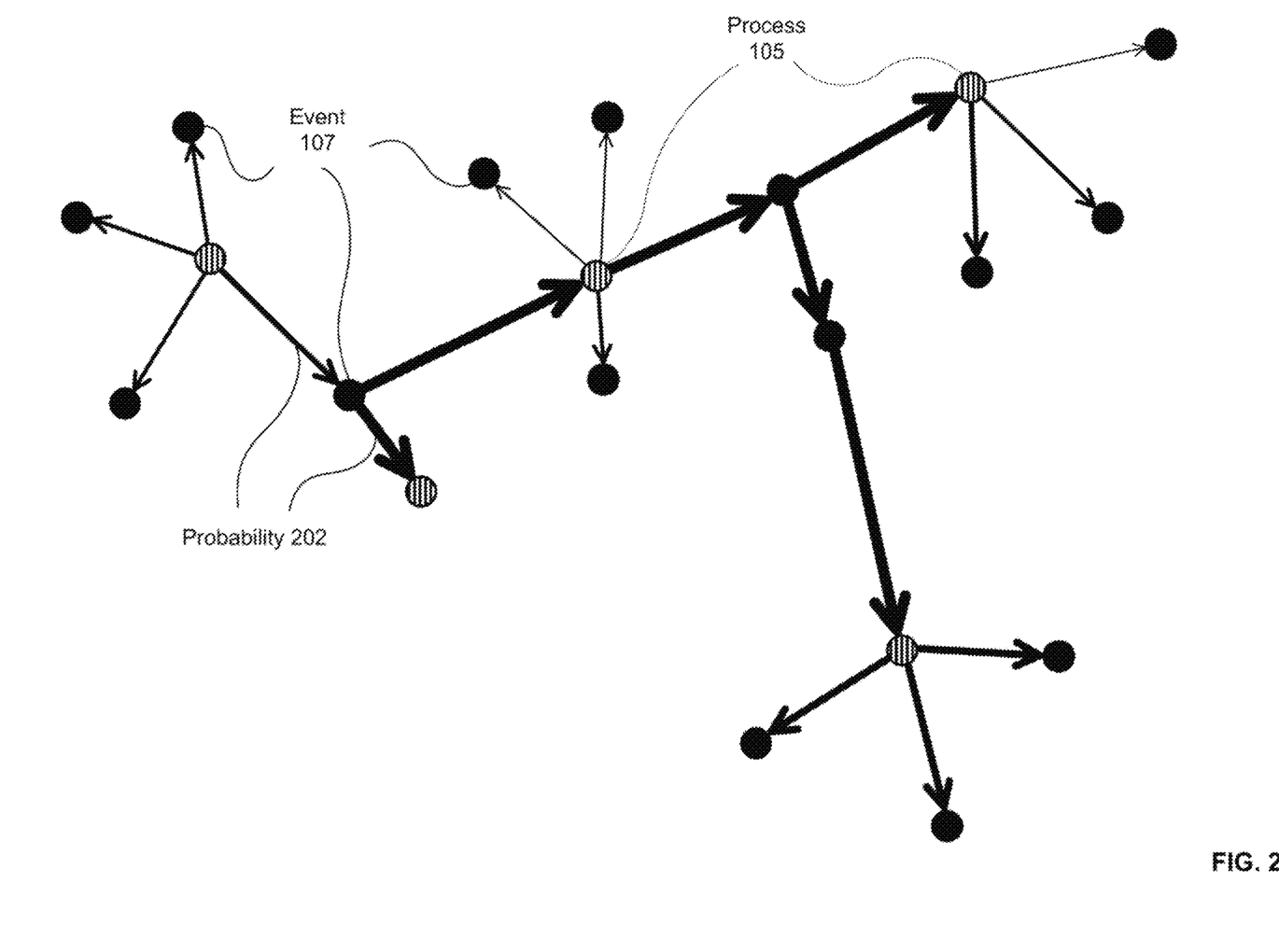
FIG. 2 shows schematically a particular example of a basic model of behavior of a trusted process in the form of a directed graph.

FIG. 2 shows schematically a particular example of a basic model of behavior of a trusted process in the form of a directed graph, in accordance with aspects of the present invention. For illustrative purposes only vertices in FIG. 2 represent-processes 105 depicted as shaded circles and events 107 depicted as solid circles. Edges in FIG. 2 represent transitions between processes 105 and events 107. Furthermore, in FIG. 2 thicknesses of each edge indicate the probability 202 of such a transition, i.e. the probability 202 of occurrence of a corresponding process 105 and/or event 107.

In an aspect, generation of a behavior log 135 (based on gathered information) may be based on the following principle.

Referring back to FIG. 1, an operating system (OS) 109 may be configured to execute a plurality of processes 105. Each OS process 105 may comprise at least one thread. The software starts execution at the entry point and runs until execution is finished, and the duration of the execution may be unlimited. In the process, the thread interacts only with its own operating memory. To change the state of the OS (for example, when performing reading and/or writing to the file, and for communication with the network or other processes) the thread may call the kernel of OS 109 using one of the system calls: syscall, sysenter or by executing int XXh instruction. All kernel services are numbered and addresses of all function calls are contained in the System Service Descriptor Table (SSDT). As a rule, functions from the OS system libraries are used, which are wrappers over these calls (ntdll.dll, kernel32.dll and others).

In one aspect, the process information may be generated by the driver 180. The driver 180 may be configured to record the system call numbers for each thread, based on which the behavior log 135 may be generated for the corresponding software process. In this case, the behavior log 135 may contain the names of the called functions associated with the numbers of system calls, and may contain the parameters of the called functions.

In yet another aspect, the behavior log 135 for a particular process 105 may be generated based on pre-collected statistical data related to the operation of processes 150 which may be contained in the data store 120. Statistical data related to the operation of processes 150 may include, but is not limited to, system call numbers, function names and function parameters that were collected during the monitoring of the execution of trusted processes or that were received from other computer systems located on the corporate network or connected via the Internet 190, or received from a remote server communicating via the Internet 190.

In yet another aspect, the data store 120 may be located at a remote server with which the network is interacting, for example through the Internet 190.

In an aspect, the training module 110 may be configured to generate a machine learning model (ML model) 170. The ML model 170 for each trusted process 105a may be generated and may be configured to assess the probability of an anomaly in the trusted process 105a. Examples of ML models 170 that me be used include, but are not limited to: naive Bayes classifiers, artificial neural networks, decision trees, and the support vector machines (SVMs).

The input parameters for training and further operation of each ML model 170 may include the parameters of events that occur during the operation of a trusted process. In one aspect, text data (for example words) from the names of functions that were found in the occurred events in a trusted process. Examples of text words that correspond to events 107 may include, but are not limited to: CreateProcess, CreateFile, and RegSetValue. In another aspect, function parameters may additionally be used as parameters. In yet another aspect, the training module 110 may request the ML models 170 for the trusted processes from a remote server that may contains pre-generated ML models 170 for various trusted processes 105a, via the Internet 190, for example.

It should be noted that, depending on the implementation of the aspects of the disclosure, the training module 110 may be implemented at a system different from system 100. In this case, communication between the system 100 and the training module 100 may be carried out using a network, for example, the Internet 190.

After generating all the necessary basic behavior models 160 and the training ML models 170 for detecting anomalies in the behavior of trusted processes and after storing the models at the data store 120, the system 100 may change the mode of operation from the mode of preparation for operation to the mode of basic operation.

In an aspect, operating in the basic operation mode, when a new trusted process is started (for example, process 105a), the control module 130 may detect the launch of the trusted process 105a. Then the control module 130, may send a request to the data store 120 and may select a basic behavior model 160 that corresponds to the detected trusted process 105a. In an aspect, the control module 130 may then start monitoring execution of the trusted process 105a. During the monitoring process, the control module 130 may compare the events that occur during execution of the trusted process 105a with the events contained in the basic behavior model 160. In aspect, based on the comparison, the control module 130 may calculate the overall probability of occurrence of events in real time. The control module 130 may perform the calculation by determining the weighting coefficient of each event in the chain of events from the basic behavior model 160 and by further multiplication of the weighting coefficients. When a predetermined threshold is reached, data may be extracted from the relevant portion of the chain of the basic behavior model 160 and the extracted data may be sent to the analysis module 140. The extracted data may be the behavior log 135 containing only the occurring events 107, the total probability of the occurrence of which has exceeded the predefined threshold, and the parameters of the specified events 107. For example, text words that occurred in the attributes of the occurring events may be used as parameters.

In an aspect, the analysis module 140 may send a request to the data store 120 to obtain ML models 170 that corresponds to the analyzed process. Next, the analysis module 140 may provide the parameters received from the control module 130 as the input parameters of the ML model 170. In an aspect, the analysis module 140 may use the ML model 170 to perform parameter analysis. In one aspect, the ML model 170 may be configured to break down the text data into words in order to analyze them. Based on the results of the analysis, the analysis module 140 may generate a decision on the presence of anomalous behavior in the trusted process 195. So, for example, the analysis module 140 may determine the presence of anomalous behavior in the trusted process 105a, if in the resulting chain of transitions between processes 105 and events 107: winword→CreateProcess-→wmic→CreateProcess, there will be lines: powershell and encodedcommand. An example where the analysis module 140 may determine that there was no anomalous behavior would be a chain of events: excel→CreateProcess and the text string being calc.exe.

It should be noted that, depending on the implementation of the disclosed system, the decision on the presence of anomalous behavior 195 made by the analysis module 140 can be either final or intermediate. In the case where the decision 195 is intermediate, the final decision may be a decision combining an intermediate decision rendered by the analysis module 140 and results received from the control module 130 that may include information about the exceeded threshold and the behavior log 135. In one aspect, the final decision 195 may be the average of the probability for the chain of events and the decision of the ML model 170.

For illustrative purposes only, below is an example of a method of detecting anomalies in the behavior of a trusted process illustrated using the exemplary executable process "winword.exe" of the Microsoft Word software.

For illustrative purposes only assume that the basic behavior model 160 corresponding to the executable file "winword.exe" has been generated as a Markov chain, as well at the ML model 170 corresponding to the same executable process.

Furthermore, assume that the basic behavior model 160 for a trusted executable process "winword.exe" includes the following events:

--- winword.exe run:
 Run the application ( Probability or weighting coefficient: 0.9);
  calc.exe (Probability: 0.7);
  cmd.exe (Probability: 0.8) execute:
   Launch the application (Probability: 0.8);
    calc.exe (Probability: 0.3);
    cmd.exe (Probability: 0.4);
    powershell.exe (Probability: 0.6);
    notepad.exe (Probability: 0.5);
    explorer.exe (Probability: 0.7);
    svchost.exe (Probability: 0.2);
   Accessing the registry (Probability: 0.9);
   Write to a file (Probability: 0.5);
    %temp% (Probability: 0.7);
    %appdata% (Probability: 0.2);
   Network access (Probability: 0.5);
    localhost (Probability: 0.6)
    *microsoft* (Probability: 0.1);
   powershell.exe (Probability: 0.7);
   notepad.exe (Probability: 0.5);
   explorer.exe (Probability: 0.7);
   svchost.exe (Probability: 0.2);
  Accessing the registry (Probability: 0.9);
  Write to a file (Probability: 1.0);;
   %temp% (Probability: 0.3);
   %appdata% (Probability: 0.4);
  Network access (Probability: 0.7);
   localhost (Probability: 0.4)
   *microsoft* (Probability: 0.7).

---

In the course of the occurrence of events in the trusted process, the system 100 may employ the control module 130 to compare the occurred events with the events in the above chain of the basic behavior model 160. As the control module 130 processes the occurring events it may calculate, in real time the overall probability of occurrence of the events 107 that have occurred. In response to determining that the total calculated probability is below a predefined threshold, the control module 130 may extract the data corresponding to the processed occurred events 107 and may send the extracted data to the analysis module 140. In an aspect, the analysis module 140 may use the received data as the input of the ML model 170 in order to perform subsequent analysis. Based on the results of the analysis of the ML model 170, the analysis module 140 may generate the decision on the presence of anomalous behavior in the trusted process 195.

In one of the aspect of the trusted process 105a, the processed part of the chain of events may contain the following events:
 winword.exe (Probability: 1.0, as it is the root process).
 Run the application (Probability: 0.9).
 cmd.exe (Probability: 0.8).
 Launch the application (Probability: 0.8).
 svchost.exe (Probability: 0.2).

Consequently, the total probability of occurrence of events contained in the above chain as calculated by the control module 130 is equal to: $1.0 \times 0.9 \times 0.8 \times 0.8 \times 0.2 = 0.11520000000000002$.

If the predefined threshold was 0.2, then the total probability is below the predefined threshold. Accordingly, the control module 130 may generate a preliminary decision on the presence of an anomaly 195. The data may then be extracted and transmitted by the control module 130 to the analysis module 140 as the input to the ML model 170. Furthermore, assume that words from system call attributes (e.g., function and event names) from corresponding chain of events 107 are used as data. In an aspect, the analysis module 140 may use the ML model 170 to analyze the received data. Based on the results of the aforementioned analysis, the analysis module 140 may generate the final decision on abnormal behavior 195.

In a particular aspect, the system 100, when deciding on the presence of anomalies in the trusted process, may additionally transfer information, including the generated decision 195 and information about the software and its trusted process, to at least one external component of the monitored computer system (not presented in FIG. 1). External components of the monitoring system may be protection components (e.g. anti-virus) that are configured to have the following functionality: preventing infection, sending a notification to the user or the corporate network management tool, blocking the execution of the process, conducting a check and the mentioned decision on false positive.

In another aspect, the system 100, in the case of transmission of information to the component of the system 100 responsible for detecting false positives, the system 100 may expect a response and may not transmit information to other components of the system 100. The response may contain information either confirming the absence of a false positive, or confirming presence of the false positive, and with the information may indicate the error that led to the erroneous decision (false positive). In response to determining that a false positive is not confirmed, the generated decision 195 may remain in force, and the system 100 may transmit information to other components and the OS 109 to ensure data protection. Otherwise, in response to confirming the false positive, the system 100 may cancel the decision on the detected anomaly 195 in the behavior of the trusted process 195 and may use the training module 110 to conduct retraining of the corresponding ML model 170 and/or may perform changes in the basic behavior model 160 based on the information received from the specified component of the system 100. The component of the system 100 responsible for detecting false positives, when implemented, may be both a technical solution that allows the system 100 to independently conduct the check, and a technical solution that may interact with the user (administrator) through the output and input elements. In an aspect, the aforementioned component may be based on the collection of data on the audited decision from other similar decisions and may use various verification rules in the analysis.

Figure 3:
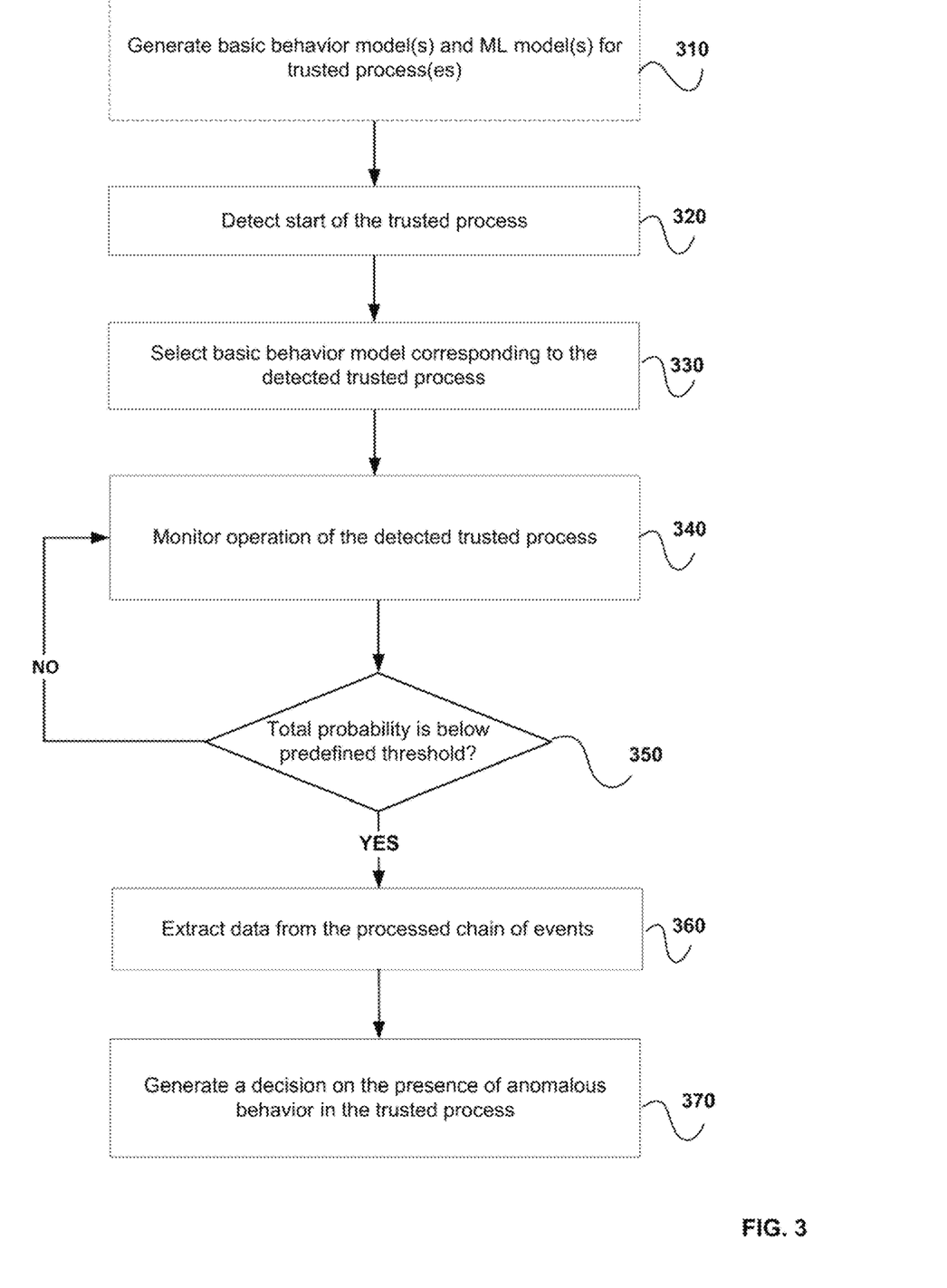
FIG. 3 is a flowchart illustrating an example method for detecting anomalies in the behavior of trusted processes based on Markov chains and a machine learning algorithm.

FIG. 3 is a flowchart illustrating an example method for detecting anomalies in the behavior of trusted processes based on Markov chains and a machine learning algorithm, in accordance with aspects of the present disclosure. In an aspect, the method presented in FIG. 3 may be implemented using the system described above in conjunction with FIG. 1.

At step 310 the system 100 may operate in the mode of preparation for operation. More specifically, at block 310, the training module 110 may generate one or more basic behavior models 160 and one or more ML models 170 for one or more trusted processes 105a, respectively. This mode of preparation for operation is described above in conjunction with FIG. 1.

At step 320, the system 100 may switch to the basic operation mode. In the basic operation mode, the control module 130 may detect the start (launch) of the trusted process, such as process 105a, for example. Then the control module 130, may send a request to the data store 120 and may select a basic behavior model 160 that corresponds to the detected trusted process 105a. In an aspect, the control module 130 may then start monitoring execution of the trusted process 105a.

At step 330, the control module 130, may send a request to the data store 120 and may select the basic behavior model 160 that corresponds to the detected trusted process 105a., In an aspect, the basic behavior model 160 may be expressed as a Markov chain.

At step 340, in an aspect, the control module 130 may then start monitoring execution of the trusted process 105a. During the monitoring process, the control module 130 may compare the events that occur during execution of the trusted process 105a with the events contained in the basic behavior model 160. Furthermore, at step 340, the control module 130 may calculate the overall probability of occurrence of events 107 in the trusted process 105a based on the basic behavior model 160, as described above.

At step 350, the control module 130 may determine whether the total probability calculated at step 340 is below the predefined threshold.

At step 360, in response to determining that the total probability has reached or exceeded a predetermined threshold (step 360, "Yes" branch), the control module 130 may extract data from the processed portion of the chain of events and may transmit the extracted data to the analysis module 140. In an aspect, the analysis module 140 may utilize the received extracted data as the input to the machine learning model (ML model) 170. In response to determining that the total probability has not reached or exceeded a predetermined threshold (step 360, "No" branch), the control module 130 may return back to the monitoring operation of the trusted process 105a (step 340).

It should be noted that, depending on the implementation, the analysis module 140 may include the ML model 170 corresponding to the trusted process 105a. In the case where the analysis module 140 does not include the corresponding ML model 170, at step 360, the analysis module 140 may first request the ML model 170 corresponding to the trusted process 105a from the data store 120, and may then pass the data to the ML model 170 as input.

In an aspect, at step 370, the analysis module 140 may generate a decision on the presence of anomalous behavior in the trusted process 195 based on the data analysis performed by the ML model 170. It should be noted that, depending on the implementation of the disclosed system, the decision on the presence of anomalous behavior 195 made by the analysis module 140 can be either final or intermediate. In the case where the decision 195 is intermediate, the final decision may be a decision combining an intermediate decision rendered by the analysis module 140 and results received from the control module 130 that may include information about the exceeded threshold and the behavior log 135. In one aspect, the final decision 195 may be the average of the probability for the chain of events and the decision of the ML model 170.

Figure 4:
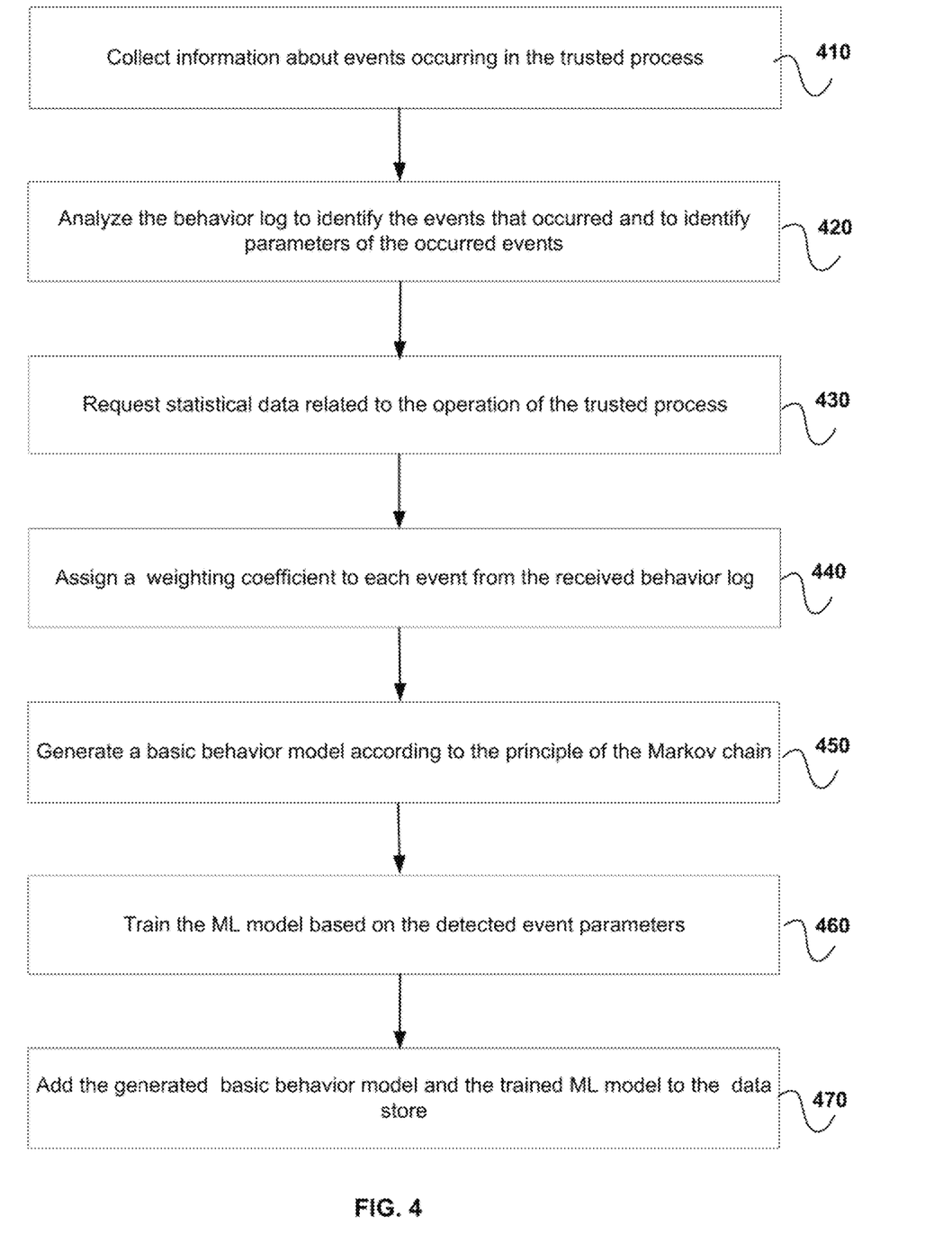
FIG. 4 is a flowchart illustrating an example of a method for the formation of a basic behavior model and a machine learning model (ML Model) for a trusted process.

FIG. 4 is a flowchart illustrating an example of a method for the formation of a basic behavior model and a machine learning model (ML Model) for a trusted process, in accordance with aspects of the present disclosure. In an aspect, the method presented in FIG. 4 may be implemented using the system described above in conjunction with FIG. 1.

In an aspect, at step 410, the driver 180 may collect information about events occurring in the trusted process, such as process 105a, during the execution of the monitored software. In an aspect, the collected information may include a behavior log 135 that may be transmitted to the learning module 110.

At step 420, the training module 110 may analyze the behavior log 135 to identify the events 107 that occurred and identify the parameters of the events 107 that occurred during the execution of the trusted process 105a. In an aspect, text words that are in the attributes of the occurred events 107 may be defined as parameters by the training module 110.

At step 430, the training module 110 may request statistical data related to the operation of the trusted process 150. In various aspects, the training module 110 may send such request either to the data store 120 and/or to the remote server.

At step 440, the training module 110 may assign a weighting coefficient to each event from the received behavior log 135. In an aspect, the training module 110 may determine the weighting coefficient for the event 107 based on the probability of the occurrence of the event in all behavior logs 135 from the collected statistical data 150. In an aspect, such probability may be calculated as the ratio of the number of occurrences of a particular event for the current process to the total number of occurrences of the same events for the current process.

In an aspect, at step 450, the training module 110 may generate a basic behavior model 160 according to the principle of the Markov chain. The use of Markov chain in the generation of the basic behavior model 160 may be implemented as a tree representation of events occurring during execution of the trusted process 105a. In an aspect, for each event 107, the probability of the occurrence of the respective event (weighting coefficient) may be determined by the training module 110.

At step 460, the training module 110 may train the ML model 170 based on the detected event parameters.

At step 470, the training module 110 may add the generated basic behavior model 160 and the trained ML model 170 to the data store 120.

Figure 5:
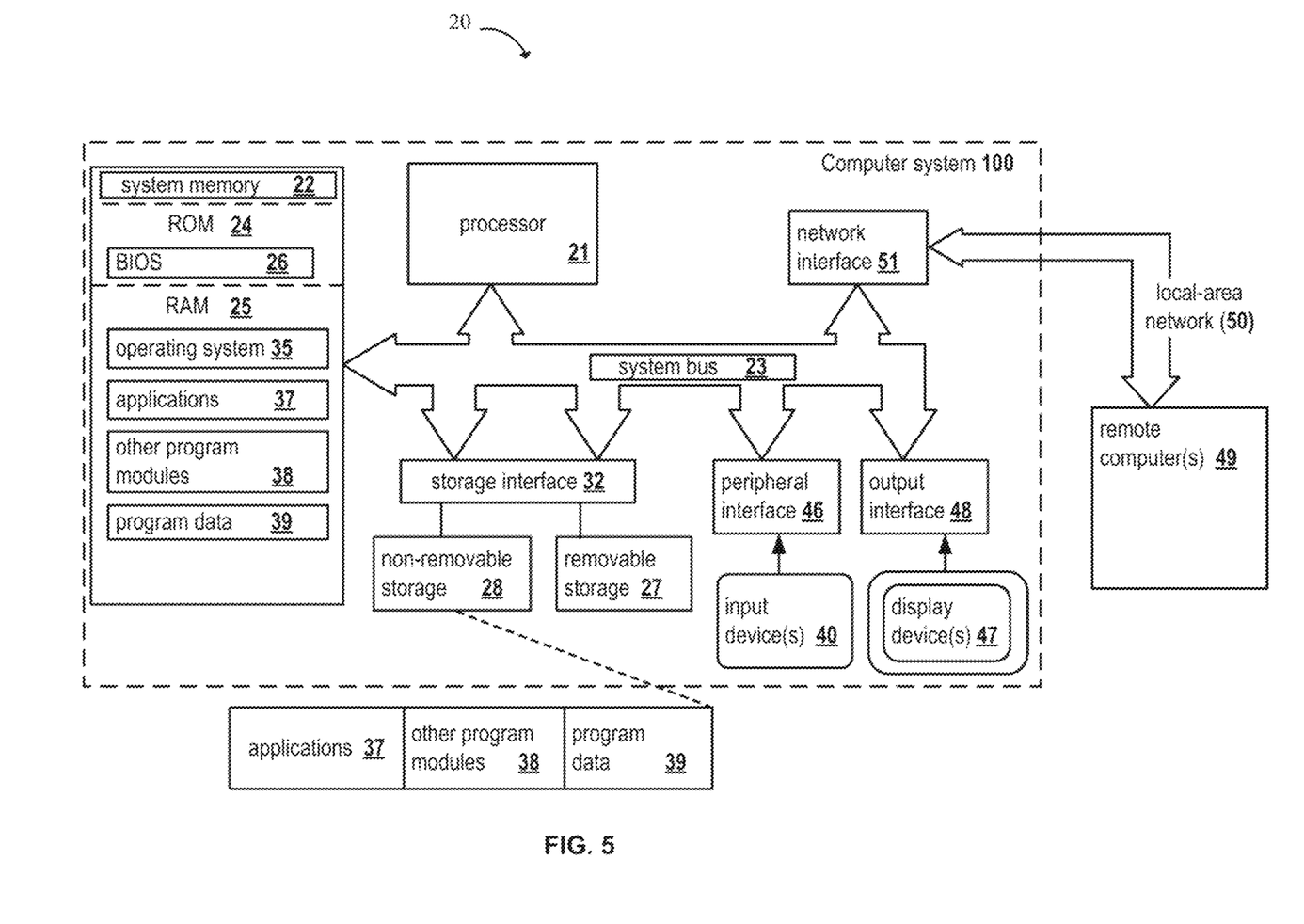
FIG. 5 shows an example of a computer system on which the variant aspects of systems and methods disclosed herein may be implemented.

FIG. 5 shows an example of a computer system on which variant aspects of systems and methods disclosed herein may be implemented. The computer system 20 may represent the system configured to implement a method for detecting anomalies in the behavior of trusted processes based on Markov chains and a machine learning algorithm of FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting an anomaly in the behavior of a trusted process comprising:

detecting a launch of a trusted process in a computer system;

selecting a basic behavior model corresponding to the trusted process to perform a first-stage anomaly detection and a machine learning model corresponding to the trusted process to perform a second-stage anomaly detection, wherein the basic behavior model is represented by a Markov chain; and performing a two-stage anomaly detection stage using the basic behavior model as the first-stage anomaly detection and the machine learning model as the second-stage anomaly detection:

performing the first-stage anomaly detection process by:

monitoring execution of the trusted process using the basic behavior model, wherein monitoring the execution comprises identifying a plurality of events occurring during the execution of the trusted process, determining probability of occurrence of each of the plurality of identified events and calculating a total probability of occurrence of all of the plurality of identified events based on the probability of occurrence of each event, and comparing the total probability of occurrence of all of the plurality of identified events with a predefined threshold, based on a determination that the total probability is greater than the predefined threshold, continue to perform the first-stage anomaly detection process by monitoring execution of the trusted process using the basic behavior model, and based on a determination that the total probability is less than the predefined threshold, performing the second-stage anomaly detection by:

extracting data corresponding to the identified events from the basic behavior model, analyzing the extracted data using the machine learning model, wherein the extracted data is used as input to the machine learning model, and generating a decision with respect to presence of anomalous behavior in the trusted process based on the analysis performed by the machine learning model; and transferring the decision to an protection component of the monitored computer system, and based on the received decision, the protection component is configured to perform one or more of blocking the execution of the process and conducting a check for false positive.

2. The method of claim 1, wherein the Markov chain contains a chain of events occurring during execution of the trusted process, and wherein each event in the chain of events has probability of occurrence associated with the corresponding event.

3. The method of claim 2, wherein the events are trusted events, wherein the trusted events have a high probability of occurrence in the chain and wherein the probability of occurrence is calculated as a ratio of the number of occurrences of a particular event for the trusted process to a total number of occurrences of the same events for the trusted process.

4. The method of claim 1, wherein the machine learning model is trained using text of words that were found in one or more attributes of the events contained in the chain.

5. The method of claim 1, wherein the machine learning model is trained in advance using one or more behavior logs containing anomalous events and using one or more behavior logs not containing anomalous events, and wherein the trained machine learning model is configured to identify, anomalous events based on low probability of occurrence.

6. The method of claim 1, further comprising blocking the trusted process and notifying a user in response to determining that the generated decision indicates presence of the anomalous behavior in the trusted process.

7. The method of claim 1, further comprising checking the generated decision for false positives.

8. The method of claim 7, wherein the machine learning model is retrained, in response to detecting a false positive.

9. A system for detecting an anomaly in the behavior of a trusted process comprising:
a memory and a hardware processor configured to:
detect a launch of a trusted process in a computer system;
select a basic behavior model corresponding to the trusted process to perform a first-stage anomaly detection and a machine learning model corresponding to the trusted process to perform a second-stage anomaly detection, wherein the basic behavior model is represented by a Markov chain; and
performing a two-stage anomaly detection stage using the basic behavior model as the first-stage anomaly detection and the machine learning model as the second-stage anomaly detection:
performing the first-stage anomaly detection process by:
monitoring execution of the trusted process using the basic behavior model, wherein monitoring the execution comprises identifying a plurality of events occurring during the execution of the trusted process, determining probability of occurrence of each of the plurality of identified events and calculating a total probability of occurrence of all of the plurality of identified events based on the probability of occurrence of each event, and
comparing the total probability of occurrence of all of the plurality of identified events with a predefined threshold,
based on a determination that the total probability is greater than the predefined threshold, continue to perform the first-stage anomaly detection process by monitoring execution of the trusted process using the basic behavior model, and
based on a determination that the total probability is less than the predefined threshold, performing the second-stage anomaly detection by:
extracting data corresponding to the identified events from the basic behavior model:
analyzing the extracted data using the machine learning model, wherein the extracted data is used as input to the machine learning model, and
generating a decision with respect to presence of anomalous behavior in the trusted process based on the analysis performed by the machine learning model; and transferring the decision to an protection component of the monitored computer system, and based on the received decision, the protection component is configured to perform one or more of blocking the execution of the process and conducting a check for false positive.

10. The system of claim 9, wherein the Markov chain contains a chain of events occurring during execution of the trusted process, and wherein each event in the chain of events has probability of occurrence associated with the corresponding event.

11. The system of claim 10, wherein the events are trusted events, wherein the trusted events have a high probability of occurrence in the chain and wherein the probability of occurrence is calculated as a ratio of the number of occurrences of a particular event for the trusted process to a total number of occurrences of the same events for the trusted process.

12. The system of claim 9, wherein the machine learning model is trained using text of words that were found in one or more attributes of the events contained in the chain.

13. The system of claim 9, wherein the machine learning model is trained in advance using one or more behavior logs containing anomalous events and using one or more behavior logs not containing anomalous events, and wherein the trained machine learning model is configured to identify, anomalous events based on low probability of occurrence.

14. The system of claim 9, wherein the hardware processor is further configured to block the trusted process and notify a user in response to determining that the generated decision indicates presence of the anomalous behavior in the trusted process.

15. The system of claim 9, wherein the hardware processor is further configured to check the generated decision for false positives.

16. The system of claim 15, wherein the machine learning model is retrained, in response to detecting a false positive.

17. A non-transitory computer readable medium storing thereon computer executable instructions for detecting an anomaly in the behavior of a trusted process, including instructions for:
detecting a launch of a trusted process in a computer system;
selecting a basic behavior model corresponding to the trusted process to perform a first-stage anomaly detection and a machine learning model corresponding to the trusted process to perform a second-stage anomaly detection, wherein the basic behavior model is represented by a Markov chain; and
performing a two-stage anomaly detection stage using the basic behavior model as the first-stage anomaly detection and the machine learning model as the second-stage anomaly detection:
performing the first-stage anomaly detection process by:
monitoring execution of the trusted process using the basic behavior model, wherein monitoring the execution comprises identifying a plurality of events occurring during the execution of the trusted process, determining probability of occurrence of each of the plurality of identified events and calculating a total probability of occurrence of all of the plurality of identified events based on the probability of occurrence of each event, and comparing the total probability of occurrence of all of the plurality of identified events with a predefined threshold, based on a determination that the total probability is greater than the predefined threshold, continue to perform the first-stage anomaly detection process by monitoring execution of the trusted process using the basic behavior model, and based on a determination that the total probability is less than the predefined threshold, performing the second-stage anomaly detection by:

extracting data corresponding to the identified events from the basic behavior model;

analyzing the extracted data using the machine learning model, wherein the extracted data is used as input to the machine learning model, and generating a decision with respect to presence of anomalous behavior in the trusted process based on the analysis performed by the machine learning model; and transferring the decision to an protection component of the monitored computer system, and based on the received decision, the protection component is configured to perform one or more of blocking the execution of the process and conducting a check for false positive.

18. The medium of claim 17, wherein the Markov chain contains a chain of events occurring during execution of the trusted process, and wherein each event in the chain of events has probability of occurrence associated with the corresponding event.

19. The medium of claim 18, wherein the events are trusted events, wherein the trusted events have a high probability of occurrence in the chain and wherein the probability of occurrence is calculated as a ratio of the number of occurrences of a particular event for the trusted process to a total number of occurrences of the same events for the trusted process.

20. The medium of claim 17, wherein the machine learning model is trained using text of words that were found in one or more attributes of the events contained in the chain.

* * * * *